United States Patent
Raddino et al.

(10) Patent No.: US 9,552,268 B2
(45) Date of Patent: Jan. 24, 2017

(54) TESTING DEVICE AND A TEST METHOD WITH ZOOM DISPLAY

(71) Applicant: Rohde & Schwarz GmbH & Co. KG, Munich (DE)

(72) Inventors: Daniela Raddino, Munich (DE); Guido Lauerburg, Mering (DE)

(73) Assignee: ROHDE & SCHWARZ GMBH & CO. KG, Munich (DE)

( * ) Notice: Subject to any disclaimer, the term of this patent is extended or adjusted under 35 U.S.C. 154(b) by 91 days.

(21) Appl. No.: 14/405,345

(22) PCT Filed: Jun. 11, 2013

(86) PCT No.: PCT/EP2013/062013
§ 371 (c)(1),
(2) Date: Dec. 3, 2014

(87) PCT Pub. No.: WO2014/009082
PCT Pub. Date: Jan. 16, 2014

(65) Prior Publication Data
US 2015/0149834 A1    May 28, 2015

(30) Foreign Application Priority Data

Jul. 9, 2012 (DE) .................. 10 2012 211 919
Sep. 13, 2012 (DE) .................. 10 2012 216 259

(51) Int. Cl.
*G06F 11/00*    (2006.01)
*G06F 11/26*    (2006.01)
(Continued)

(52) U.S. Cl.
CPC ............. *G06F 11/26* (2013.01); *H04L 43/18* (2013.01); *H04L 43/50* (2013.01); *H04L 41/22* (2013.01); *H04L 43/028* (2013.01)

(58) Field of Classification Search
CPC .......... G06F 11/26; H04L 41/22; H04L 43/18; H04L 43/028; H04L 43/50
See application file for complete search history.

(56) References Cited

U.S. PATENT DOCUMENTS 6,219,050 B1    4/2001   Schaffer
6,584,501 B1    6/2003   Cartsonis et al.
(Continued)

FOREIGN PATENT DOCUMENTS

CN    101636934 A    1/2010
DE    10313589 A1    8/2004
(Continued)

OTHER PUBLICATIONS

Notification of Transmittal of Translation of the International Preliminary Report on Patentability; International Preliminary Report on Patentability; Written Opinion of the International Searching Authority for corresponding International Application No. PCT/EP2013/062013, dated Jan. 22, 2015, 8 pages.
(Continued)

*Primary Examiner* — Joshua P Lottich
(74) *Attorney, Agent, or Firm* — Ditthavong & Steiner, P.C.

(57) ABSTRACT

A testing device (10) comprises a storage unit (13), a display unit (11) and a control unit (12). The storage unit (13) is embodied to store messages of at least one test performed on at least one device under test. The control unit (12) is embodied to read in at least one part of the messages, to add them to a selection and to display at least an excerpt of the selection in a view on the display unit (11). The control unit (12) provides a zoom device (16), which, in the selection of messages, controlled by a user by means of an operating device (14), is configured
 to increase a number of contained messages in the case of a first user entry, and/or
(Continued)

to reduce a number of contained messages in the case of a second user entry.

16 Claims, 12 Drawing Sheets

(51) Int. Cl.
  *H04L 12/26* (2006.01)
  *H04L 12/24* (2006.01)

(56) References Cited

U.S. PATENT DOCUMENTS

| | | |
|---|---|---|
| 2003/0091165 A1 | 5/2003 | Bearden et al. |
| 2005/0243728 A1 | 11/2005 | Vehse et al. |
| 2010/0093283 A1 | 4/2010 | Negami et al. |
| 2013/0005271 A1 | 1/2013 | Negami et al. |
| 2013/0005373 A1 | 1/2013 | Negami et al. |

FOREIGN PATENT DOCUMENTS

| | | |
|---|---|---|
| EP | 1098491 A2 | 5/2001 |
| EP | 1587244 A1 | 10/2005 |
| EP | 2117133 A1 | 11/2009 |
| JP | 2001177595 A | 6/2001 |
| JP | 4951007 B2 | 6/2012 |
| WO | 2008096551 A1 | 8/2008 |

OTHER PUBLICATIONS

International Search Report corresponding to PCT/EP2013/062013, dated May 9, 2013, 2 pages.

| Id | Laye | SAP | Servi | Pr | PDU |
|---|---|---|---|---|---|
| 19985 | LAYER_ | EPSNAS | RRC_EPS | Ind | EpsL3Message:EMM Attach Request;ESM PDN Connectivity Request |
| 20145 | LAYER_ | EPSNAS | RRC_EPS | Req | EpsL3Message:EMM Identity Request |
| 20235 | LAYER_ | EPSNAS | RRC_EPS | Ind | EpsL3Message:EMM Identity Response |
| 20319 | LAYER_ | EPSNAS | RRC_EPS | Ind | EpsL3Message:ESM PDN Connectivity Request |
| 20420 | LAYER_ | EPSNAS | RRC_EPS | Req | EpsL3Message:EMM Authentication Request |
| 20575 | LAYER_ | EPSNAS | RRC_EPS | Ind | EpsL3Message:EMM Authentication Response |
| 20719 | LAYER_ | EPSNAS | RRC_EPS | Req | EpsL3Message:EMM Security Mode Command |
| 20838 | LAYER_ | EPSNAS | RRC_EPS | Ind | EpsL3Message:EMM Security Mode Complete |
| 21825 | LAYER_ | EPSNAS | RRC_EPS | Req | EpsL3Message:EMM Attach Accept;ESM Activate Default EPS Bearer Context |
| 22118 | LAYER_ | EPSNAS | RRC_EPS | Ind | EpsL3Message:EMM Attach Complete;ESM Activate Default EPS Bearer Context |
| 22172 | LAYER_ | EPSNAS | RRC_EPS | Ind | EpsL3Message:ESM Activate Default EPS Bearer Context Accept |
| 53076 | LAYER_ | EPSNAS | RRC_EPS | Ind | EpsL3Message:EMM Service Request |
| 281037 | LAYER_ | EPSNAS | RRC_EPS | Req | EpsL3Message:EMM Detach Request |
| 281243 | LAYER_ | EPSNAS | RRC_EPS | Ind | EpsL3Message:EMM Detach Accept |

Fig. 5

| Total : 51 | | | | | Filter : LTE_Standard= |
|---|---|---|---|---|---|
| Id | Laye | SAP | Servi | Pr | PDU |
| 546 | RRC | RRC_INF | RRC_LOG | Ind | SystemInformationBlockType1 |
| 547 | RRC | RRC_INF | RRC_LOG | Ind | SystemInformationBlockType2 |
| 548 | RRC | RRC_INF | RRC_LOG | Ind | SystemInformationBlockType3 |
| 549 | RRC | RRC_INF | RRC_LOG | Ind | SystemInformationBlockType4 |
| 550 | RRC | RRC_INF | RRC_LOG | Ind | SystemInformationBlockType5 |
| 593 | RRC | CRRC | CRRC_CE | Req | MasterInformationBlock |
| 609 | RRC | RRC_INF | RRC_LOG | Ind | SystemInformationBlockType1 |
| 610 | RRC | RRC_INF | RRC_LOG | Ind | SystemInformationBlockType2::SystemInformationBlockType3 |
| 611 | RRC | RRC_INF | RRC_LOG | Ind | SystemInformationBlockType4 |
| 612 | RRC | RRC_INF | RRC_LOG | Ind | SystemInformationBlockType5 |
| 19827 | RRC | CRRC | CRRC_UL | Ind | RRCConnectionRequest |
| 19840 | RRC | CRRC | CRRC_DL | Req | RRCConnectionSetup |
| 19979 | RRC | CRRC | CRRC_UL | Ind | RRCConnectionSetupComplete |
| 19985 | LAYER_ | EPSNAS | RRC_EPS | Ind | EpsL3Message:EMM Attach Request;ESM PDN Connectivity Request |
| 20145 | LAYER_ | EPSNAS | RRC_EPS | Req | EpsL3Message:EMM Identity Request |
| 20162 | RRC | CRRC | CRRC_DL | Req | DLInformationTransfer |
| 20226 | RRC | CRRC | CRRC_UL | Ind | ULInformationTransfer |
| 20235 | LAYER_ | EPSNAS | RRC_EPS | Ind | EpsL3Message:EMM Identity Response |
| 20319 | LAYER_ | EPSNAS | RRC_EPS | Req | EpsL3Message:ESM PDN Connectivity Request |
| 20420 | LAYER_ | EPSNAS | RRC_EPS | Req | EpsL3Message:EMM Authentication Request |
| 20439 | RRC | CRRC | CRRC_DL | Req | DLInformationTransfer |
| 20569 | RRC | CRRC | CRRC_UL | Ind | ULInformationTransfer |
| 20575 | LAYER_ | EPSNAS | RRC_EPS | Ind | EpsL3Message:EMM Authentication Response |
| 20719 | LAYER_ | EPSNAS | RRC_EPS | Req | EpsL3Message:EMM Security Mode Command |
| 20762 | RRC | CRRC | CRRC_DL | Req | DLInformationTransfer |
| 20829 | RRC | CRRC | CRRC_UL | Ind | ULInformationTransfer |
| 20838 | LAYER_ | EPSNAS | RRC_EPS | Ind | EpsL3Message:EMM Security Mode Complete |
| 20891 | RRC | CRRC | CRRC_DL | Req | UECapabilityEnquiry |
| 20965 | RRC | CRRC | CRRC_UL | Ind | UECapabilityInformation |
| 21281 | RRC | CRRC | CRRC_DL | Req | SecurityModeCommand |
| 21366 | RRC | CRRC | CRRC_UL | Ind | SecurityModeComplete |

Fig. 6

| Table View | | | | | | |
|---|---|---|---|---|---|---|
| Total : 279851 | | | | | | Filter : Untit |
| Id | Laye | SAP | Service | Pri | PDU | Auxiliary |
| 19961 | PHY | PHY_SAP | PHY_DATA | Ind | Mac Uplink Pdu | |
| 19962 | PHY | PHY_SAP | PHY_DATA | Ind | | |
| 19963 | PHY | PHY_SAP | PHY_DATA | Req | | |
| 19964 | PHY | PHY_SAP | PHY_DATA | Req | | |
| 19965 | PHY | PHY_SAP | PHY_DATA | Ind | Mac Uplink Pdu(2) | |
| 19966 | RRC | RRRC | RRRC_STATUS | Ind | | |
| 19967 | PHY | PHY_SAP | PHY_DATA | Req | | |
| 19968 | PHY | PHY_SAP | PHY_DATA | Ind | Mac Uplink Pdu | |
| 19969 | PHY | PHY_SAP | PHY_DATA | Req | | |
| 19970 | PHY | PHY_SAP | PHY_DATA | Ind | Mac Uplink Pdu | |
| 19971 | PHY | PHY_SAP | PHY_DATA | Req | | |
| 19972 | PHY | PHY_SAP | PHY_DATA | Ind | Mac Uplink Pdu | |
| 19973 | PHY | PHY_SAP | PHY_DATA | Req | MasterInformationBlock | BCCH type=SI-1(1): |
| 19974 | PHY | PHY_SAP | PHY_DATA | Ind | Mac Uplink Pdu | |
| 19975 | PHY | PHY_SAP | PHY_DATA | Req | | |
| 19976 | PHY | PHY_SAP | PHY_DATA | Ind | Mac Uplink Pdu | |
| 19977 | PHY | PHY_SAP | PHY_DATA | Req | | |
| 19978 | PHY | PHY_SAP | PHY_DATA | Req | | |
| 19979 | RRC | CRRC | CRRC_UL_DCCH_MESSAGE | Ind | RRCConnectionSetupComplete | RRC Result=OK(0): |
| 19980 | PHY | PHY_SAP | PHY_DATA | Req | | |
| 19981 | PHY | PHY_SAP | PHY_DATA | Req | Mac Uplink Pdu(2) | |
| 19985 | LAYER | EPSNAS | RRC_EPS_NAS_DEDIC/ | Ind | EpsL3Message;EMM Attach R( | Attach Type=EPS Only / |
| 19986 | PHY | PHY_SAP | PHY_DATA | Req | | |
| 19987 | PHY | PHY_SAP | PHY_DATA | Ind | Mac Uplink Pdu | |
| 19997 | PHY | PHY_SAP | PHY_DATA | Req | | BCCH type=SIB1(0): |
| 19998 | PHY | PHY_SAP | PHY_DATA | Ind | Mac Uplink Pdu | |
| 20003 | PHY | PHY_SAP | PHY_DATA | Req | | |
| 20004 | PHY | PHY_SAP | PHY_DATA | Ind | Mac Uplink Pdu | |
| 20009 | PHY | PHY_SAP | PHY_DATA | Req | | |
| 20010 | PHY | PHY_SAP | PHY_DATA | Ind | Mac Uplink Pdu | |
| 20012 | PHY | PHY_SAP | PHY_DATA | Req | | |

Fig. 8

| | Main | Filter | Table | Help | | | | |
|---|---|---|---|---|---|---|---|---|
| Table View | | | | | | | | Filter : Untitled |
| Total : 10 | | | | | | | | |
| Id | Laye | SAP | Service | Pri1 | PD | Auxiliary | | |
| 269 | (E)MM3 | EMMI | ATCommand | Req | | Command=(Power off UE.); | | |
| 276 | (E)MM3 | EMMI | ATCommand | Cnf | | ResultString=(OK); | | |
| 676 | (E)MM3 | EMMI | ATCommand | Req | | Command=(Please switch on the UE.); | | |
| 7598 | (E)MM3 | EMMI | ATCommand | Cnf | | ResultString=(OK); | | |
| 22518 | (E)MM3 | EMMI | ATCommand | Req | | Command=(Release RRCConnection.); | | |
| 49199 | (E)MM3 | EMMI | ATCommand | Cnf | | ResultString=(OK); | | |
| 49449 | (E)MM3 | EMMI | ATCommand | Req | | Command=(Trigger MO call to reestablish DRB.); | | |
| 52102 | (E)MM3 | EMMI | ATCommand | Cnf | | ResultString=(OK); | | |
| 53914 | (E)MM3 | EMMI | ATCommand | Req | | Command=(Verify Data Path with IP.); | | |
| 281011 | (E)MM3 | EMMI | ATCommand | Cnf | | ResultString=(OK); | | |

Project Browser

Fig. 9

| Id | Laye | SAP | Service | Prin | I | Auxiliary |
|---|---|---|---|---|---|---|
| 476 | GUI | TestCase | Status | Ind | | Text=(## LTE ## ReleaseLabelInfo::LTE_INT_RT_28.35.0.1 |
| 483 | GUI | TestCase | Status | Ind | | Text=(## LTE ## SystemSetup Performed ); |
| 497 | GUI | TestCase | Status | Ind | | Text=(## LTE ## Dl Total Power : -600 _cBr_); |
| 502 | GUI | TestCase | Status | Ind | | Text=(## LTE ## RS Offset : -50 _cBr_); |
| 507 | GUI | TestCase | Status | Ind | | Text=(## LTE ## RS EPRE: -927 _cBr_); |
| 526 | GUI | TestCase | Status | Ind | | Text=(## LTE ## PRACH power = -3.3 _dBr_ is below the 'Lte |
| 531 | GUI | TestCase | Status | Ind | | Text=(## LTE ## Recomendation: change the 'Minimum PRACH p |
| 557 | GUI | TestCase | Status | Ind | | Text=(## LTE ## SIBs configured ); |
| 566 | GUI | TestCase | Status | Ind | | Text=(## LTE ## Initializing CRRC PowerConfiguration .); |
| 594 | GUI | TestCase | Status | Ind | | Text=(## LTE ## .############################################## |
| 636 | GUI | TestCase | Status | Ind | | Text=(## LTE ## Cell configured ); |
| 655 | GUI | TestCase | Status | Ind | | Text=(## LTE ## CellSetup Performed ); |
| 662 | GUI | TestCase | Verdict | Ind | | Verdict=PASS(1); Type=PRELIM(0); |
| 676 | (E)MM] | EMMI | ATCorrand | Req | | Corrand=(Please switch on the UE.); |
| 7598 | (E)MM] | EMMI | ATCorrand | Cnf | | ResultString=(OK); |
| 7612 | GUI | TestCase | Status | Ind | | Text=(## LTE ## Waiting for RRC Connection Request from UE |
| 7630 | GUI | TestCase | Status | Ind | | Text=(## LTE ## Change of PA Value On Cell::0 with::-30 -cB |
| 19843 | GUI | TestCase | Status | Ind | | Text=(## LTE ## RRCConnectionRequest received with EstCause |
| 20002 | GUI | TestCase | Status | Ind | | Text=(## LTE ## RRCConnectionSetup Completed ); |
| 20056 | GUI | TestCase | Verdict | Ind | | Verdict=PASS(1); Type=PRELIM(0); |
| 20099 | GUI | TestCase | Status | Ind | | Text=(## LTE ## IMSI value not present in Attach Request ); |
| 20250 | GUI | TestCase | Status | Ind | | Text=(## LTE ## Identity Response Received ); |
| 20313 | GUI | TestCase | Verdict | Ind | | Verdict=PASS(1); Type=PRELIM(0); |
| 20588 | GUI | TestCase | Status | Ind | | Text=(## LTE ## Authentication successful ); |
| 20614 | GUI | TestCase | Verdict | Ind | | Verdict=PASS(1); Type=PRELIM(0); |
| 20850 | GUI | TestCase | Status | Ind | | Text=(## LTE ## NAS Security activated ); |
| 20870 | GUI | TestCase | Verdict | Ind | | Verdict=PASS(1); Type=PRELIM(0); |
| 20973 | GUI | TestCase | Status | Ind | | Text=(## LTE ## UECapabilityInformation Received); |
| 21002 | GUI | TestCase | Status | Ind | | Text=(## LTE ## EUTRA UE category = 3.EUTRA UE release = re |
| 21078 | GUI | TestCase | Verdict | Ind | | Verdict=PASS(1); Type=PRELIM(0); |
| 21202 | GUI | TestCase | Status | Ind | | Text=(## LTE ## RRC integrity protection is enabled ); |

TESTING DEVICE AND A TEST METHOD WITH ZOOM DISPLAY

CROSS-REFERENCE TO RELATED APPLICATION

The present application a national phase application of PCT application No. PCT/EP2013/062013, filed Jun. 11, 2013, and claims priority to German Application No. DE 10 2012 211 919.1 filed on Jul. 9, 2012 and German Application No. DE 10 2012 216 259.3 filed on Sep. 13, 2012, the entire contents of which are herein incorporated by reference.

BACKGROUND OF THE INVENTION

Field of the Invention

The invention, according to the various embodiments described herein, relates to a testing device and a test method which are suitable for displaying recorded test results with a zoom display.

Discussion of the Background

A central problem in the analysis of signalling protocol processes is, among the plethora of signalling messages, to identify procedures which do not conform to the specifications in a rapid and targeted manner. In many cases of error in this context, it is not sufficient to search for messages with an incorrect content or incorrect transmission/reception time, but complex dependencies between protocol messages must be recognized.

Signalling protocols in message networks are tested by means of network simulators. In this context, in the case of a test, a given sequence of signalling procedures is stimulated by the network simulator. Accordingly, always starting with a well-defined starting condition, the reaction of the device under test (DUT=device under test) is registered and checked against the defined, set behaviour according to the set specification. In this context, the overall message exchange between the network simulator and the device under test is recorded on the various protocol layers in a log file with timestamps. The display and evaluation of this log file is implemented after the completion of the test case with the assistance of special applications (Log File Viewer). To search for errors, the user can analyse the protocol process in a sequential manner, filter the content of the log file according to freely selectable criteria and search for given messages.

SUMMARY OF THE INVENTION

Embodiments of a testing device and a method which allow a simple and intuitive navigation within recorded test results are provided herein.

A testing device according to one embodiment includes a storage unit, a display unit and a control unit. The storage unit may be configured to store messages of at least one test performed on at least one device under test. The control unit may be configured-to read in at least a part of the messages, to add them to a selection and to display at least an excerpt of the selection in a view on the display unit. The control unit includes a zoom device, in one embodiment, in the selection of messages, controlled by a user by means of an operating device, in the case of a first user entry, to increase a number of contained messages, and/or in the case of a second user entry, to reduce a number of contained messages. Accordingly, a simple and intuitive navigation within the stored messages is possible.

By preference, the zoom device may be configured to increase the number of contained messages in the case of the first user entry by adopting messages of lower protocol layers into the selection, and/or to reduce the number of contained messages in the case of the second user entry by removing messages of lower protocol layers from the selection. It is therefore possible to switch between different quantities of displayed messages in a very simple manner.

By preference, the messages belong to different message types. The zoom device is then embodied to increase the number of contained messages in the case of the first user entry by adopting a larger number of different message types into the selection and/or to reduce the number of contained messages in the case of the second user entry by adopting a smaller number of different message types into the selection. With this selection of messages to be displayed, the quantity of displayed messages can also be adjusted in a very intuitive manner.

In another embodiment, each of the messages advantageously provides either a first direction from the device under test to the testing device or a second direction from the testing device to the device under test. The control unit may then include a shift device, which may be embodied, in the selection, controlled by a user by means of an operating device, in the case of a third user entry, to contain only messages of the first direction, and/or in the case of a fourth user entry, to contain only messages of the second direction. This alternative selection possibility of the messages to be displayed also allows the user to adjust the quantity of messages to be displayed in an intuitive manner.

The control unit preferably includes a shift device. The latter is configured to display the view in different display types. In the case of a fifth user entry, the view may be displayed in a first display type. In the case of a sixth user entry, the view may be displayed in a second display type. By particular preference, the first display type is a message list, and the second display type is a message-sequence list. In this manner, it is possible to select an alternative display type with reduced operating complexity.

In yet another embodiment, the storage unit is preferably configured to store test sequences, test procedures and source texts of at least one test performed on at least one device under test. In one embodiment, the control unit may then comprise a shift device which may be embodied, in the selection, controlled by a user by means of the operating device, in the case of a seventh user entry, to contain only messages, and/or in the case of an eighth user entry to contain only test sequences, test procedures and source texts. This selection option also offers the user a simple and intuitive operability.

By preference, the zoom device is configured to switch between a display of test sequences, test procedures and source texts in the view. In the case of a ninth user entry, it is switched from a display of test sequences to a display of test procedures and from a display of test procedures to a display of source texts. In the case of a tenth user entry, it is switched from a display of test procedures to a display of test sequences and/or from a display of source texts to a display of test procedures. This switching possibility also allows a very intuitive operation.

In another embodiment, a method serves for the processing of messages. The messages of at least one test performed on at least one device under test are stored. At least a part of the messages are read in and added to a selection. At least an excerpt of the selection may be displayed in a view. In the selection of messages, controlled by a user, in the case of a first user entry, a number of contained messages may be increased, while, in the case of a second user entry, a number of contained messages may be reduced. In this manner, a simple and intuitive navigation within the stored messages is possible.

BRIEF DESCRIPTION OF THE DRAWINGS

In the following, the invention is described by way of example with reference to the drawings in which embodiments of the invention is shown. The drawings show:

FIG. 5 a first presentation of a display unit of the testing device according to one embodiment;

FIG. 6 a second presentation of a display unit of the testing device according to one embodiment;

FIG. 8 a fourth presentation of a display unit of the testing device according to one embodiment;

FIG. 9 a fifth presentation of a display unit of the testing device according to one embodiment;

FIG. 10 a sixth presentation of a display unit of the testing device according to one embodiment;

FIG. 11 a seventh presentation of a display unit of the testing device according to one embodiment, and FIG. 12 an of the method in a flow diagram, according to one embodiment.

Initially, the structure and the general functioning of an embodiment of the testing device will be explained with reference to FIG. 1. Following this, the functioning of various display concepts which are used by the embodiment of the testing device will be explained with reference to FIGS. 2-4. With reference to FIGS. 5-11, presentations of a display unit of an embodiment of the testing device will then be shown. Finally, with reference to FIG. 12, the function of an embodiment of the method will be presented. In some cases, the presentation and description of identical elements has not been repeated in similar drawings.

FIG. 1 shows a testing device 10 according to one embodiment. The testing device 10 contains a display unit 11, a control unit 12, a storage unit 13 and an operating device 14. In this context, the display unit 11 is connected to the control unit 12. The latter is connected in turn to the storage unit 13 and to the operating device 14. Accordingly, the control unit 12 contains a display-control device 15, a zoom device 16, a processing device 17 and a shift device 18. In this context, the display unit 11 is connected to the display-control device 15. The latter is connected in turn to the processing device 17, which is connected in turn to the zoom device 16 and the shift device 18 and the storage unit 13 and the operating device 14.

Figure 1:
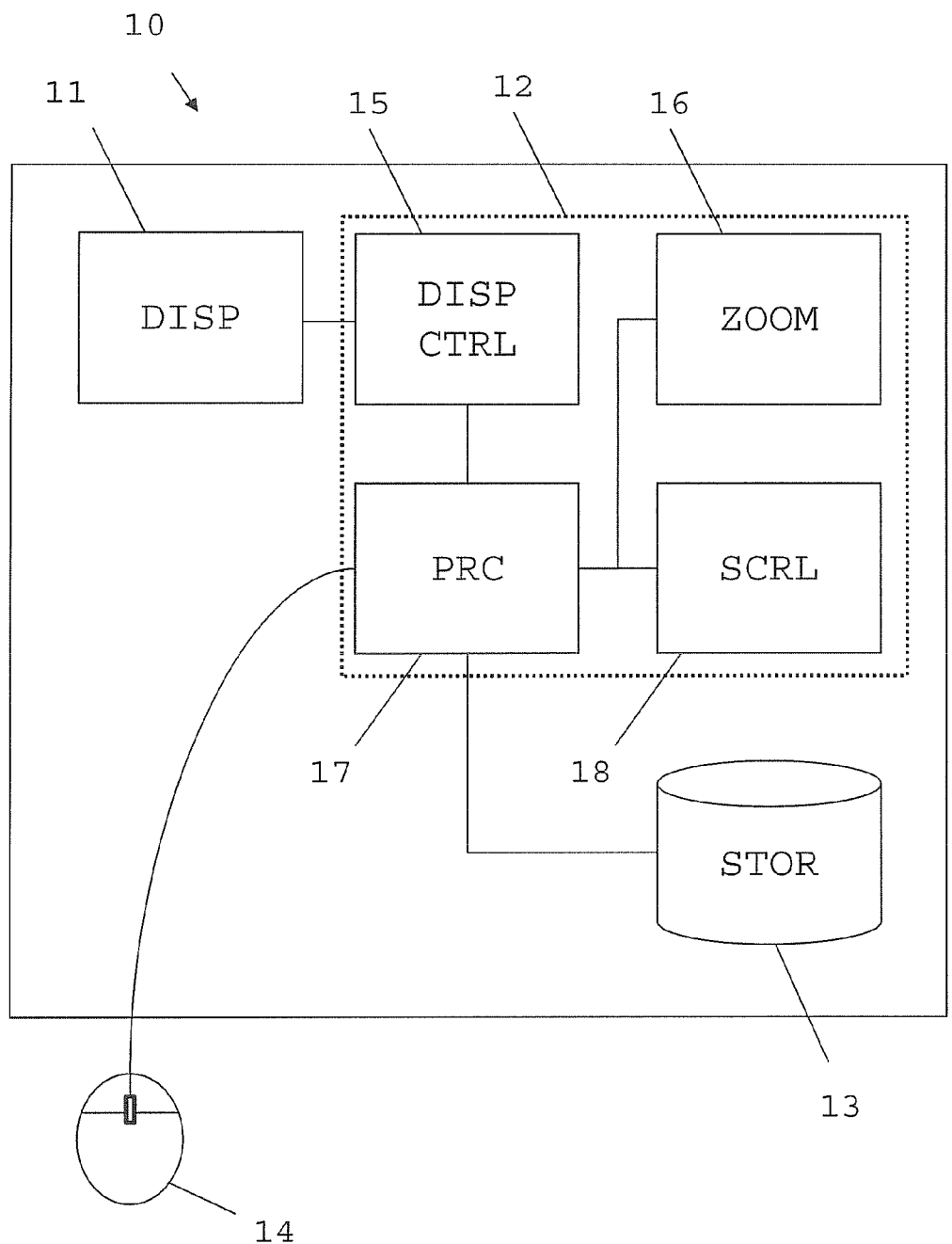
FIG. 1 a testing device according to one embodiment.

Accordingly, the control unit 12 is configured to read out from the storage unit 13 a log file which contains numerous messages and optionally further information, such as test sequences, test procedures and source texts. In this context, the reading out is implemented by the processing device 17. By means of the display-control device 15, the processing device 17 displays at least a part of the messages in a view on the display unit 11. Only a selection of the messages respectively other information from the log file is accordingly displayed in the view.

The zoom device 16 is accordingly configured to allow a navigation by zooming into and zooming out from the view on the display unit 11. A zooming in accordingly causes an increase in the number of messages present in the selection. At the same time, a zooming out causes a reduction of this number of messages. However, if other information, such as test sequences, test procedures and source texts are displayed instead of the messages, a zooming in causes a switchover from test sequences to test procedures and from test procedures to source texts. A zooming out then brings about a switch from source texts to test procedures and from test procedures to test sequences. The exact functioning of the zoom device 16 will be explained in greater detail with reference to FIGS. 2-11.

Furthermore, the shift device 18 also serves the simple and intuitive navigation within the stored test results from the log file respectively within the other information stored there. Accordingly, the shift device 18 allows a switch between messages which have been transmitted from the device under test and messages which have been transmitted from the testing device. As an alternative, it can also be switched with the shift device 18 between a display of messages from the log file and other information from the log file. The functioning of the shift device 18 will also be explained in greater detail with reference to FIGS. 2-11.

The functions of the zoom device 16 and the shift device 18 are controlled in this context by a user of the testing device via the operating device 14. Accordingly, a zoom process could be triggered, for example, by a rotation of a mouse wheel, if the operating device 14 is a mouse. Alternatively, a button on the display unit 11 which triggers a zooming in or zooming out could, of course, also be selected by means of the mouse. This is shown in greater detail with reference to FIG. 8. Furthermore, a keyboard or a track-pad can, of course, also be used instead of a mouse.

The shift device 18 is also controlled in a similar manner via the operating device 14 and therefore by the user. Accordingly, a shift process, for example, a switching between a display of messages and other information, or switching between messages transmitted from the device under test or messages transmitted from the testing device, can also be implemented by selecting buttons on the display unit 11 by means of the operating device 14. A keyboard or a track-pad can, of course, also be used here.

Figure 2:
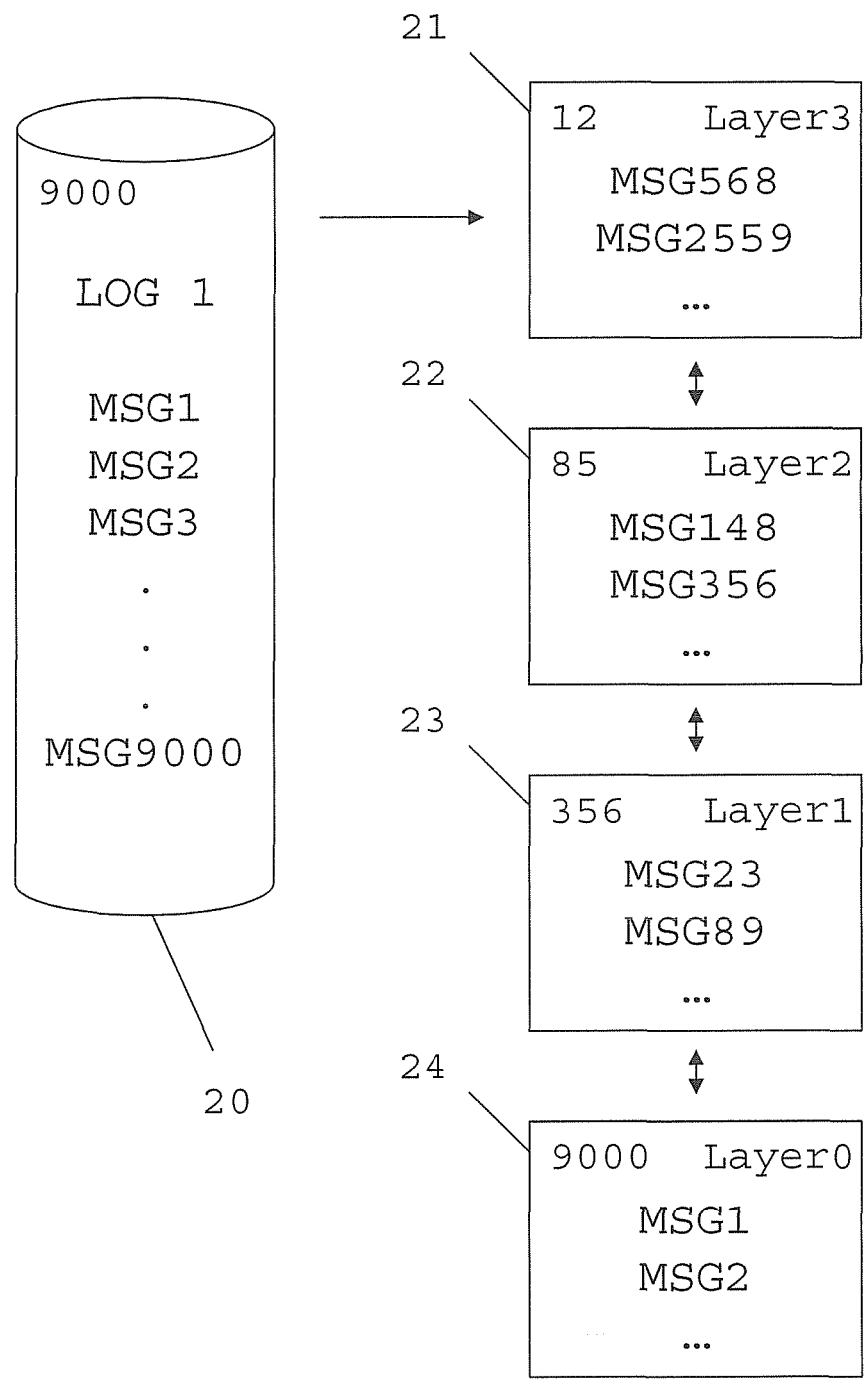
FIG. 2 a schematic presentation of a first display concept, according to one embodiment.

FIG. 2 shows a first display concept which is used by the embodiment of the testing device according to one embodiment. A log file 20 contains 9000 messages MSG1-MSG9000. A view 21 is first generated from this log file 20. As shown at top left, this view 21 contains a total of only 12 messages. All of the messages illustrated here correspond to a protocol layer named "Layer 3". The 12 messages illustrated here correspond to the protocol layer "Layer 3" or layers disposed above this.

Since only a very small excerpt is selected here, with 12 of the 9000 messages, only a very rough overview of the course of the measurement can be obtained. However, with a zoom device, the user can switch to the more accurate view 22. This is about a zooming in. The view 22 now shows a total of 85 messages. In this context, all of these 85 messages correspond to the protocol layer "Layer 2" or layers disposed above this. That is, all of the messages shown in the view 21 are also displayed here.

A further zooming in leads to a third view 23, which already shows 356 messages. In this context, all of these messages correspond to a protocol layer named "Layer 1" or protocol layers disposed higher than this. All of the messages displayed in the views 21 and 22 are also displayed here. A further zooming in reaches a view 24 which shows all 9000 messages from the log file 20. That is, this view 24 shows only protocol layers which correspond to the layer "Layer 0" and protocol layers disposed higher than this. Of course, this now includes all protocol layers.

Zooming out in each case returns to the previously named view 21-23. In this context, navigation is only possible between directly adjacent views 21-24. Of course, it is also possible to zoom out even further than view 21. The views then contain protocol layers which are disposed above the protocol layer "Layer 3". Furthermore, it is additionally conceivable to introduce a further zoom step below the view 24. In this case, a further view would show the contents of the individual messages.

The view 21 need not be generated as the first view. Alternatively, any arbitrary other of the views 22-24 can also be generated as the first view.

Figure 3:
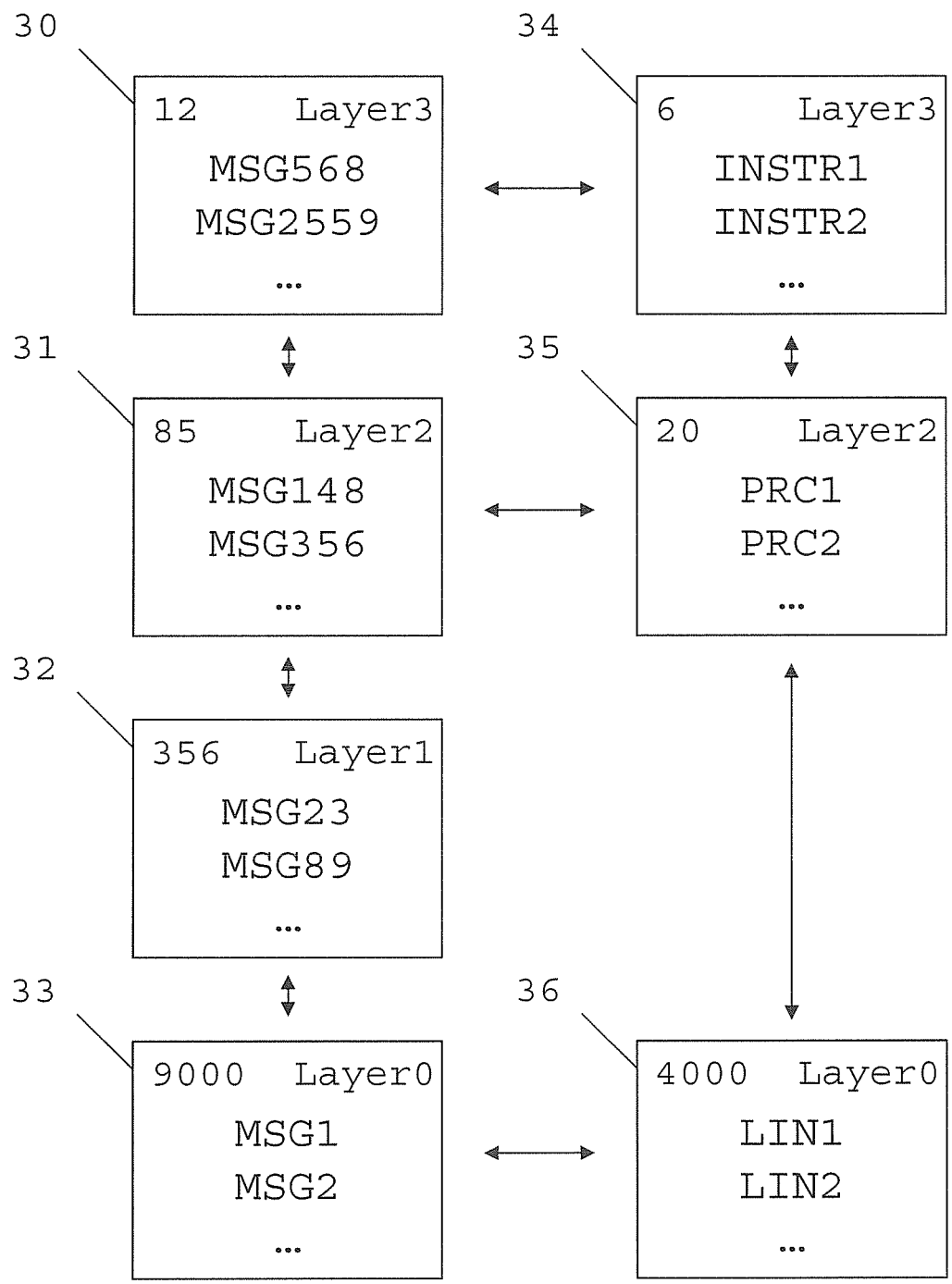
FIG. 3 a schematic presentation of a second display concept, according to one embodiment.

FIG. 3 shows a second display concept which can be used by an embodiment of the testing device according to one embodiment.

Reference to the new display of the log file 20 from FIG. 2 is dispensed with here.

As already explained with reference to FIG. 2, a first view can be generated on an arbitrary zoom step. Views 30-36 are illustrated here. The view 30 corresponds in this context to view 21 from FIG. 2. The view 31 corresponds to view 22 from FIG. 2. The view 32 corresponds to view 23 from FIG. 2. The view 33 corresponds to view 24 from FIG. 2. As explained in that context, it is possible to switch as required between directly adjacent views 30-33 by zooming in and zooming out. These zooming processes are implemented by the zoom device 16 from FIG. 1.

Additionally, functions of the shift device 18 are shown here. Accordingly, starting from the view 30, it is possible to move to a view 34. The view 34 shows a test sequence in several instructions INSTR1, INSTR2. A total of 6 instructions are shown here.

This test sequence corresponds in its protocol layer to the view 30 and accordingly to the protocol layer "Layer 3". By means of the shift device 18, it is possible to change arbitrarily between the views 30 and 34. By means of a zoom process, starting from view 34, it is possible to change to a view 35. The view 35 in this context shows test procedures. In total, the view 35 shows 20 test procedures, as shown at top left. Accordingly, view 35 corresponds to the protocol layer "Layer 2". In this context, it is also possible to change freely between view 31 and view 35 using the shift device 18. With a further zooming in, starting from view 35, a view 36 is reached.

The view 36 shows code lines of a source text underlying the test sequence. As shown at top left, 4000 code lines are illustrated here. This represents the lowest hierarchy layer, that is, the source text corresponds in its hierarchy to the protocol layer "Layer 0". Accordingly, it is also possible to change freely between the view 33 and the view 36 using the shift device 18.

As is clearly evident here, each of the views 30-33 need not correspond to a view 34-36. In this case, it is not possible to change from the view 32 by means of the shift device 18. Alternatively, a change to the view 35 or view 36 could take place.

Figure 4:
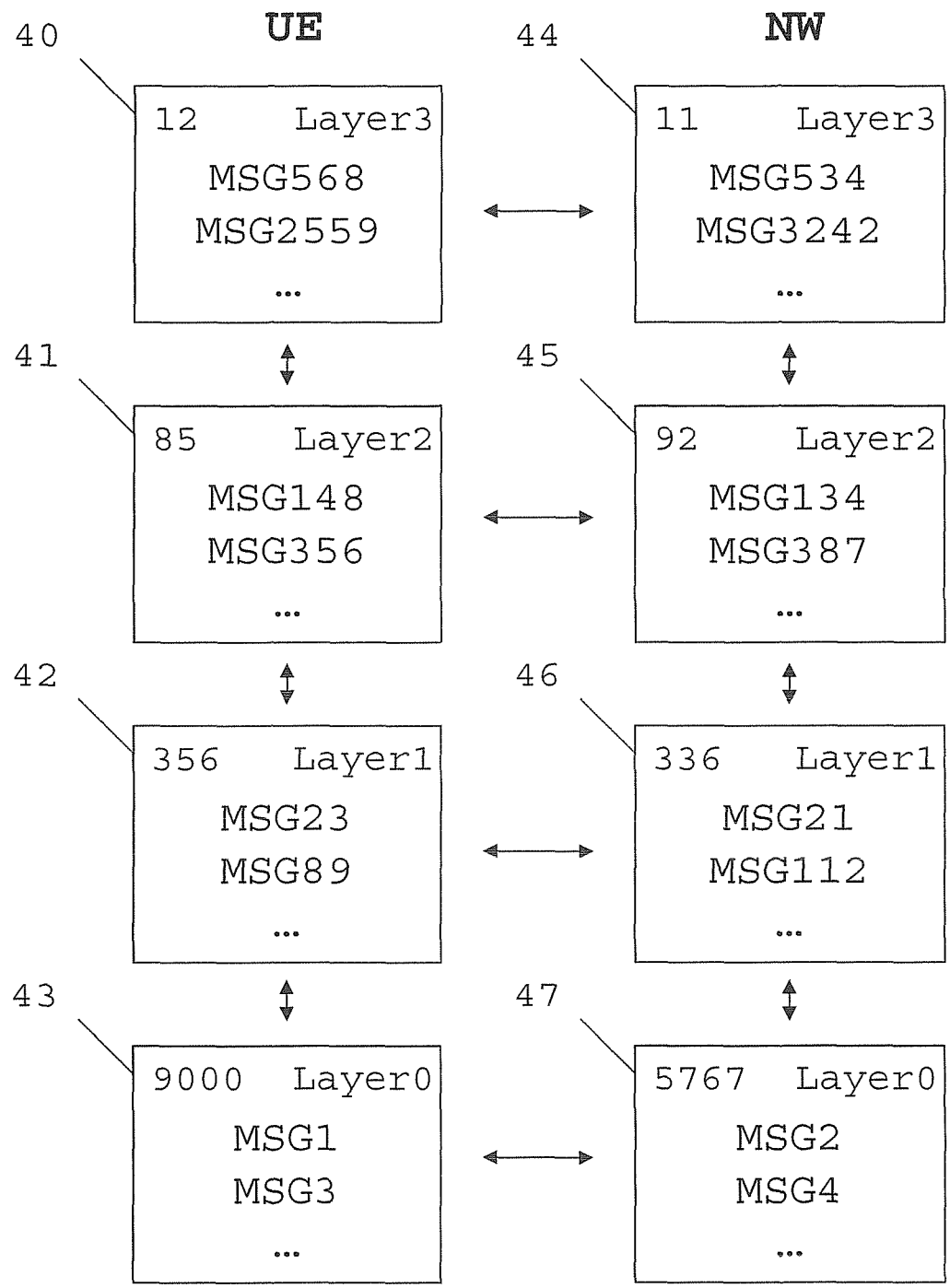
FIG. 4 a schematic presentation of a third display concept, according to one embodiment.

FIG. 4 shows a third display concept which is used by an embodiment of the testing device according to one embodiment. Here, a switching by means of the shift device 18 serves to switch between messages which were transmitted from the device under test, which are illustrated here on the left, and messages which were transmitted from the testing device which are illustrated here on the right. The views 40-43 correspond to the views 30-33 from FIG. 3. In each case, the views 44-47 are arranged alongside. Views of an identical protocol layer are arranged opposite to one another in each case. Accordingly, the view 40 is disposed opposite to a view 44, view 41 opposite to a view 45, view 42 opposite to a view 46, while the view 43 is disposed opposite to a view 47. By means of the shift device 18 from FIG. 1, it is therefore possible to change arbitrarily between directly adjacent views in the pairings just named. Furthermore, it is also possible to switch freely within the views 40-43 or respectively 44-47 by using the zoom device 16. A display of several views at the same time is also possible and is not precluded by the present invention.

Of course, the precise numbers of messages transmitted on the individual protocol layers generally differ. Accordingly, the message numbers also naturally differ. In part, the same messages are displayed. In this case, the message numbers naturally do not change.

FIG. 5 shows a first illustration of the display unit 11 of an embodiment of the testing device according to one embodiment. Only messages of the protocol layer "NAS" are shown here. At the top left it is evident that only 14 messages are displayed here. A menu bar which is used for the implementation of settings by the user is additionally clearly evident here. In the column "Id", the message number is shown. In the column "Laye", the protocol layer is shown. In the column "SAP", the column "Servi", the column "Pr" and the column "PDU", further information relating to the individual messages is shown.

If, starting from this view, a zooming in is controlled by the user by means of a user entry, a view as shown in FIG. 6 will be reached. Here, a total of 51 messages is now shown, which additionally shows all messages from the protocol layer "RRC". It is clearly evident here that all of the messages displayed in FIG. 5 are also displayed here. However, additional messages which are not shown in FIG. 5, are disposed between these messages in the log file.

Figure 7:
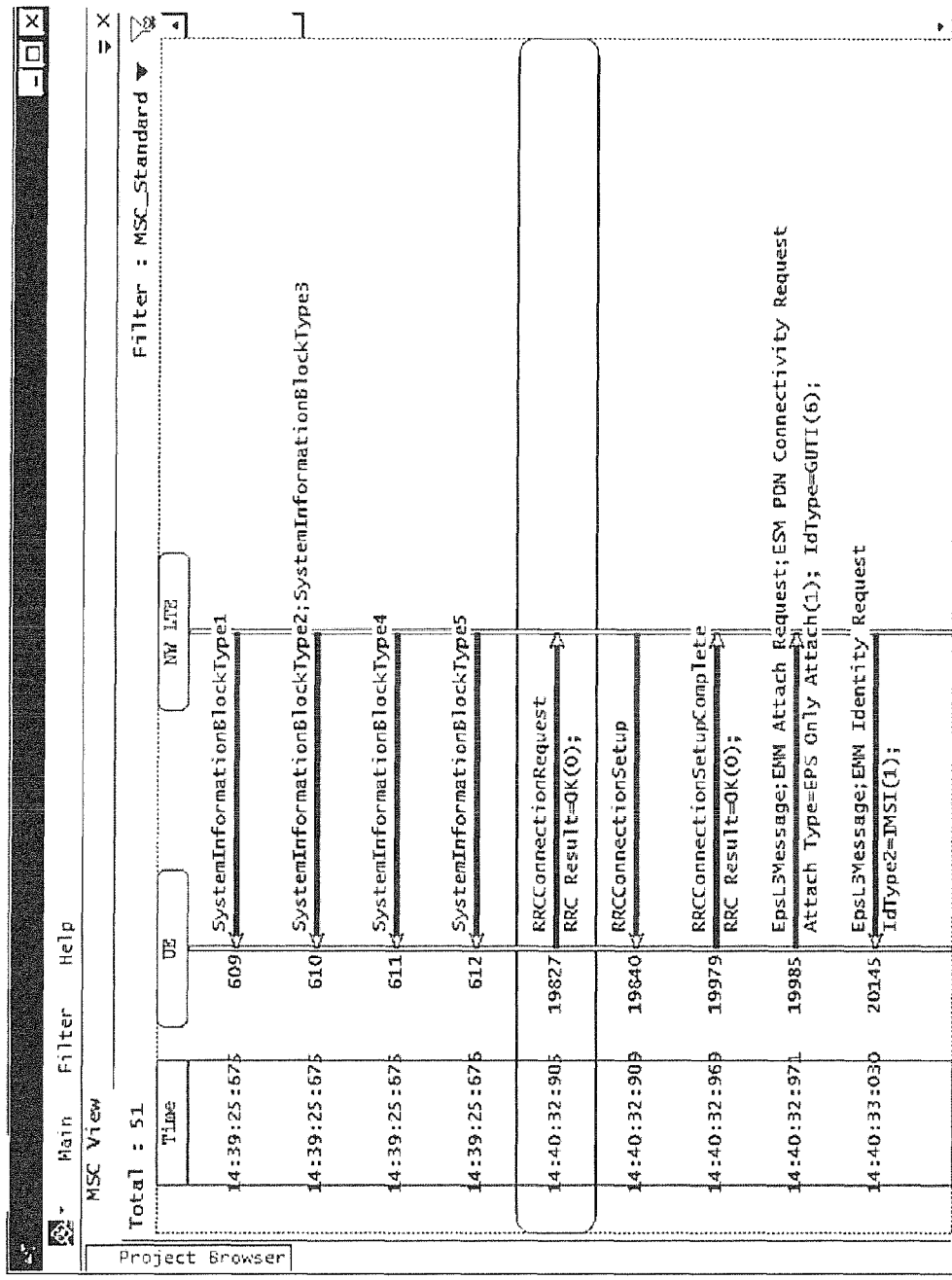
FIG. 7 a third presentation of a display unit of the testing device according to one embodiment.

Starting from the view illustrated in FIG. 6, it is possible to cause a change in the display type by means of the shift device 18 from FIG. 1. Accordingly, FIG. 7 shows the identical messages which are also illustrated in FIG. 6, however, not as a message list as in FIG. 6, but as a message-sequence list. In this manner, it can be seen from which transmitter to which receiver the respective message has been sent. The abbreviation "UE" in this context denotes the device under test, while the abbreviation "NW LTE" denotes the testing device. The time of transmission of each message is additionally shown here.

By contrast, if, starting from FIG. 6, a further zooming in is controlled by the user, the view from FIG. 8 is reached. All of the protocol layers are now shown there, that is, a very large number of messages, here, a total of 279,851 messages are displayed. At the same time, of course, only a very much smaller number of messages can also be displayed on the display unit 11. It is possible to navigate within this long list of messages by means of the scroll bar at bottom right.

Control elements 80 and 81 for controlling the shift device 18 and the zoom device 16 are additionally illustrated in FIG. 8. One control element 80 in this context serves to control the shift device 18, while a control element 81 serves to control the zoom device 16. The corresponding operating process is triggered by selecting the corresponding arrows of the control elements 80, 81 by means of the operating device 14 from FIG. 1. For the sake of visual clarity, these control elements 80, 81 have not been shown in the other illustrations from FIGS. 5-11.

For further improved visual clarity, these control elements can additionally be displayed transparent. Furthermore, the display of the control elements 80, 81 is not necessary if the operation is not performed through a selection of the control elements by means of a mouse but by means of dedicated key commands or, for example, a scrolling by means of the mouse wheel.

A zoom process within a pure display of messages has therefore now been shown with reference to FIGS. 5-8. In the following section, a zoom process within other information which is stored in the logic file will now be shown with reference to FIGS. 9-11.

FIG. 9 shows a fifth view of the display unit 11 of an embodiment of the testing device 10 according to the embodiment from FIG. 1. Here, only control commands which instruct a test person to implement given settings in the testing device respectively the device under test are now illustrated. In this context, an instruction to switch off the device under test is given, for example, in the message with the message number 269. Switching on the testing device again is displayed, for example, in message 676. A total of 10 corresponding control commands is shown here. The sum of control commands here corresponds to a test sequence.

If, starting from this view, a zooming in is controlled by the user, the view from FIG. 10 is reached. FIG. 10 shows a sixth display of the display unit 11 of the embodiment of the testing device according to the embodiment from FIG. 1. In addition to the control commands to the test person, text outputs to the test person are now also shown here. Accordingly, in each case, the text shown in the column "Auxiliary" is displayed to the test person on the display unit during the implementation of the measurement.

Figure 11:
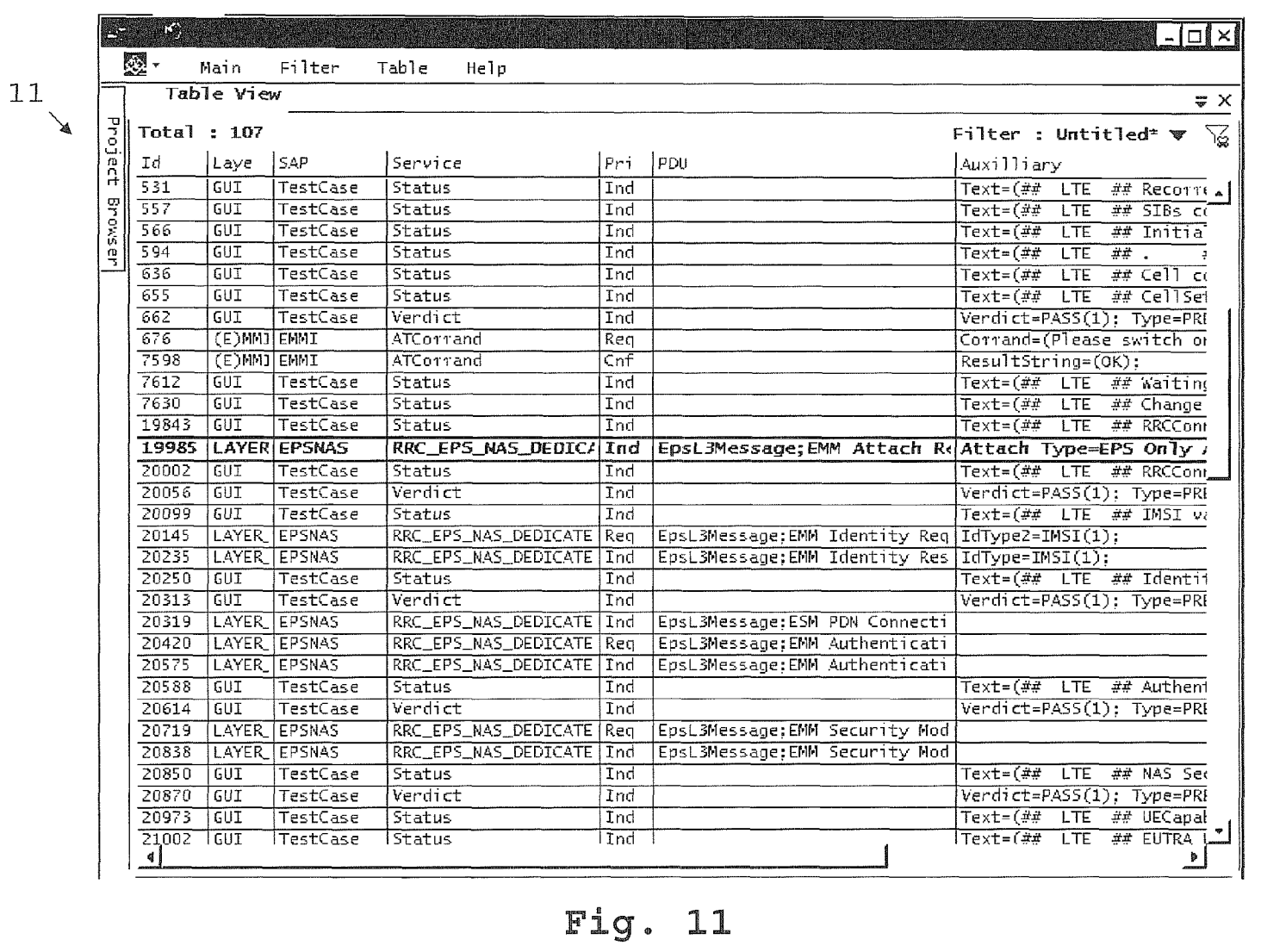

If, starting from this display, a zooming in is controlled by the user, a view such as that shown in FIG. 11 is reached. FIG. 11 shows a seventh view of the display unit of an embodiment of the testing device 10. A total of 107 messages are displayed here. Alongside the illustrated control commands and text messages from FIGS. 9 and 10, protocol messages are additionally displayed here. Alternatively, a display of source texts can also be provided here.

The previously shown view can also be changed in the views shown in FIGS. 9-11 in each case by zooming out.

Figure 12:
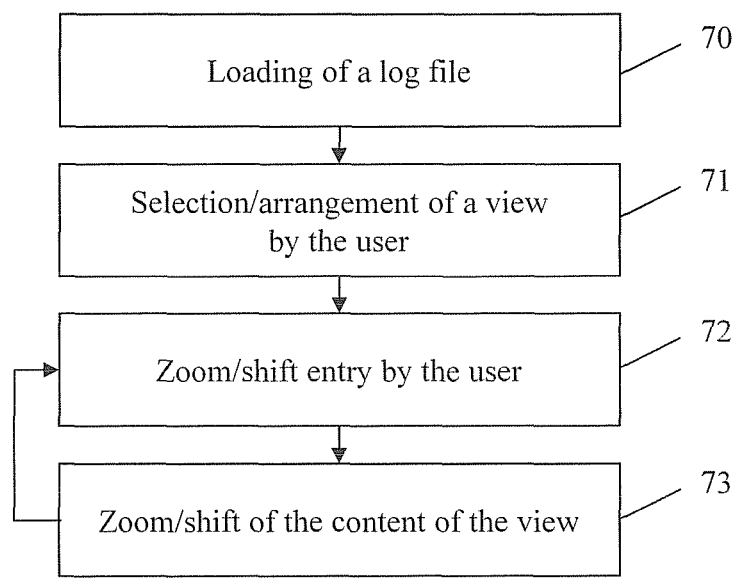

FIG. 12 shows an embodiment of the method according to one embodiment. In a first step 70, a log file of an already implemented measurement on a device under test is read in. Of course, the process can also be performed with a currently implemented measurement. A use of a log file stored online is also possible. In a second step 71, a selection and arrangement of a view on the display unit is implemented by a user. This view now already shows messages respectively other information from the log file in the format and position on the display unit selected by the user.

In a third step 72, the user enters a user entry, which triggers a zoom process respectively shift process. In a fourth step 73, the corresponding zoom process respectively shift process is implemented in the last selected view, that is, if the user has controlled, for example, a zooming in, the content of the view is enriched with additional information. With regard to the different zoom processes and shift processes, reference is made to the deliberations relating to FIGS. 2-11.

The invention is not restricted to the illustrated embodiment. An extremely diverse range of test processes can be displayed. A wide range of different devices under test can also be used. All of the features described above or illustrated in the Figures can be advantageously combined arbitrarily with one another within the scope of the invention.

The invention claimed is:

1. A testing device with a storage unit, a display unit and a control unit, wherein the storage unit is embodied to store messages of at least one test performed on at least one device under test,
   wherein the control unit is embodied to read in at least a part of the messages, to add them to a selection and to display at least an excerpt from the selection in a view on the display unit,
   wherein the control unit provides a zoom device, which, in the selection of messages, controlled by a user by means of an operating device, is embodied
      to increase a number of contained messages in the case of a first user entry and/or
      to reduce a number of contained messages in the case of a second user entry, and
   wherein the control unit comprises a shift device, which is embodied to
      display the view in different display types, and
      to display the view in a first display type in the case of a fifth user entry, and
      to display the view in a second display type in the case of a sixth user entry, and
   wherein, by preference, the first display type is a message list, and the second display type is a message-sequence list.

2. The testing device according to claim 1,
   wherein the zoom device is embodied to increase the number of contained messages in the case of the first user entry by adopting messages of lower protocol layers into the selection, and/or to reduce the number of contained messages in the case of the second user entry by removing messages of lower protocol layers from the selection.

3. The testing device according to claim 1,
   wherein the messages belong to different message types, wherein the zoom device is embodied to increase the number of contained messages in the case of the first user entry by adopting a larger number of different message types into the selection and/or to reduce the number of contained messages in the case of the second user entry by adopting a smaller number of different message types into the selection.

4. The testing device according to claim 1,
   wherein each of the messages provides a first direction from the device under test to the testing device or a second direction from the testing device to the device under test, and
   wherein the control unit comprises a shift device, which, in the selection, controlled by a user by means of the operating device, is embodied
      to contain only messages of the first direction in the case of a third user entry, and/or
      to contain only messages of the second direction in the case of a fourth user entry.

5. The testing device according to claim 1,
   wherein the first user entry is a zooming in, and
   wherein the second user entry is a zooming out, and/or that the third user entry is a shift, and that the fourth user entry is a shift, and/or
   wherein the fifth user entry is a shift, and that the sixth user entry is a shift, and/or
   wherein the seventh user entry is a shift, and that the eighth user entry is a shift, and/or
   wherein the ninth user entry is a zooming in, and that the tenth user entry is a zooming out.

6. A testing device with a storage unit, a display unit and a control unit, wherein the storage unit is embodied to store messages of at least one test performed on at least one device under test,
   wherein the control unit is embodied to read in at least a part of the messages, to add them to a selection and to display at least an excerpt from the selection in a view-on the display unit
   wherein the control unit provides a zoom device, which, in the selection of messages, controlled by a user by means of an operating device, is embodied
      to increase a number of contained messages in the case of a first user entry and/or
      to reduce a number of contained messages in the case of a second user entry,
   wherein the storage unit is embodied to store test sequences test procedures and source texts of at least one test performed on at least one device under test, and
   wherein the control unit comprises a shift device, which, in the selection, controlled by a user by means of the operating device, is embodied
      to contain only messages in the case of a seventh user entry and
      to contain only test sequences, test procedures and source texts in the case of an eighth user entry.

7. A testing device with a storage unit, a display unit and a control unit, wherein the storage unit is embodied to store messages of at least one test performed on at least one device under test,
   wherein the control unit is embodied to read in at least a part of the messages, to add them to a selection and to display at least an excerpt from the selection in a view-on the display unit
   wherein the control unit provides a zoom device, which, in the selection of messages, controlled by a user by means of an operating device, is embodied
      to increase a number of contained messages in the case of a first user entry and/or
      to reduce a number of contained messages in the case of a second user entry,
   wherein the zoom device is embodied to switch between a display of test sequences, test procedures and source texts in the view in the case of an ninth user entry, to switch from a display of test sequences to a display of test procedures and from a display of test procedures to a display of source texts, and, in the case of a tenth user entry, to switch from a display of test procedures to a display of test sequences and from a display of source texts to a display of test procedures.

8. A method for the automatic processing of messages, wherein the messages of at least one test performed on at least one device under test are stored in the storage unit,
   wherein at least a part of the messages are read in and added to a selection, and at least an excerpt from the selection is displayed on a display unit in a view,
   wherein in the selection of messages, controlled by a control unit,
      in the case of a first user entry in an operating device, a number of contained messages is increased, and
      in the case of a second user entry in an operating device, a number of contained messages is reduced.
   wherein the view can be displayed in different display types,
   wherein, in the case of a fifth user entry, the view is displayed in a first display type, and/or
   wherein, in the case of a sixth user entry, the view is displayed in a second display type, and that, by preference, the first display type is a message list, and the second display type is a message-sequence list.

9. The method according to claim 8,
   wherein in the case of the first user entry, the number of contained messages is increased by adopting messages of lower protocol layers into the selection, and/or
   wherein, in the case of the second user entry, the number of contained messages is reduced by removing messages of lower protocol layers from the selection.

10. The method according to claim 8,
   wherein the messages belong to different message types and that, in the case of the first user entry, the number of contained messages is increased by adopting a larger number of different message types into the selection, and/or
   wherein, in the case of the second user entry, the number of contained messages is reduced by adopting a smaller number of different message types into the selection.

11. The method according to claim 8,
   wherein each of the messages provides either a first direction starting from a device under test or a second direction towards the device under test, and that, in the selection, controlled by a user,
      only messages of the first direction are contained in the case of a third user entry, and
      only messages of the second direction are contained in the case of a fourth user entry.

12. The method according to claim 8,
   wherein the first user entry is a zooming in, and that-the second user entry is a zooming out, and/or
   wherein the third user entry is a shift, and that the fourth user entry is a shift, and/or
   wherein the fifth user entry is a shift, and that the sixth the user entry is shift, and/or
   wherein the seventh user entry is a shift, and that the eighth user entry is a shift, and/or
   wherein the ninth user entry is a zooming in, and that the tenth user entry is a zooming out.

13. A non-transitory computer readable medium containing program instructions for causing a computer or a digital processor to perform the method of claim 8.

14. A computer-program product with program-code means stored on a non-transitory machine-readable data carrier for the performance of all of the steps according to claim 8 when the program is executed on a computer or a digital signal processor.

15. A method for the automatic processing of messages,
   wherein the messages of at least one test performed on at least one device under test are stored in the storage unit,
   wherein at least a part of the messages are read in and added to a selection, and at least an excerpt from the selection is displayed on a display unit in a view,
   wherein in the selection of messages, controlled by a control unit,
      in the case of a first user entry in an operating device, a number of contained messages is increased, and
      in the case of a second user entry in an operating device, a number of contained messages is reduced,
   wherein test sequences, test procedures and source texts of at least one test performed on at least one device under test are stored, and that, in the selection, controlled by a user, in the case of a seventh user entry, only messages are contained and/or, in the case of an eighth user entry, only test sequences, test procedures and source texts are contained.

16. A method for the automatic processing of messages,
wherein the messages of at least one test performed on at
   least one device under test are stored in the storage unit,
wherein at least a part of the messages are read in and
   added to a selection, and at least an excerpt from the
   selection is displayed on a display unit in a view,
wherein in the selection of messages, controlled by a
   control unit,
   in the case of a first user entry in an operating device,
      a number of contained messages is increased, and
   in the case of a second user entry in an operating
      device, a number of contained messages is reduced,
wherein it is switched between a display of test sequences,
   test procedures and source texts in the view,
wherein, in the case of a ninth user entry, it is switched
   from a display of test sequences to a display of test
   procedures and from a display of test procedures to a
   display of source texts, and/or
wherein, in the case of a tenth user entry, it is switched
   from a display of test procedures to a display of test
   sequences and from a display of source texts to a
   display of test procedures.

\* \* \* \* \*